Nov. 17, 1970   M. L. EDWARDS   3,541,595
MEMBRANE FLUID DIFFUSION EXCHANGE DEVICE
Filed June 9, 1969                                2 Sheets-Sheet 1
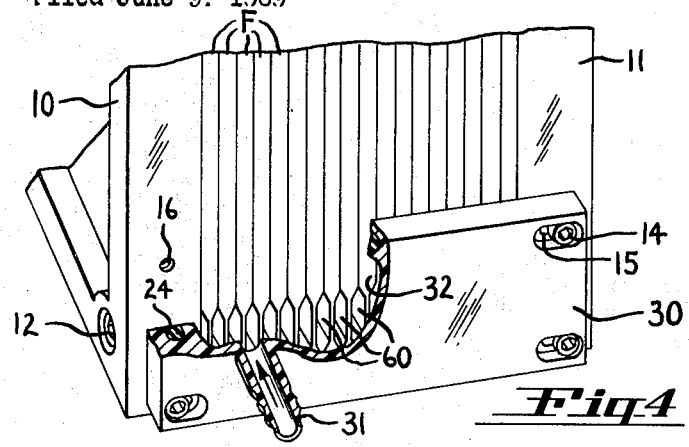
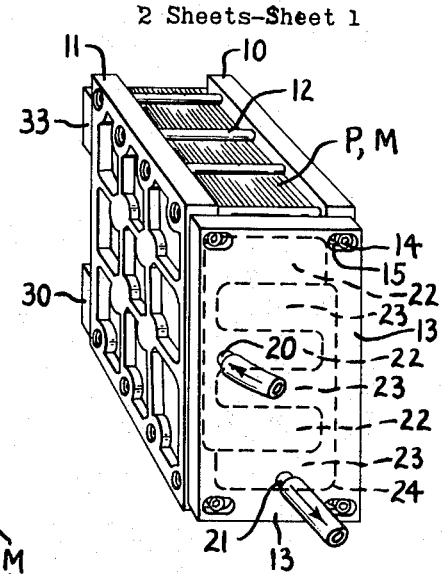
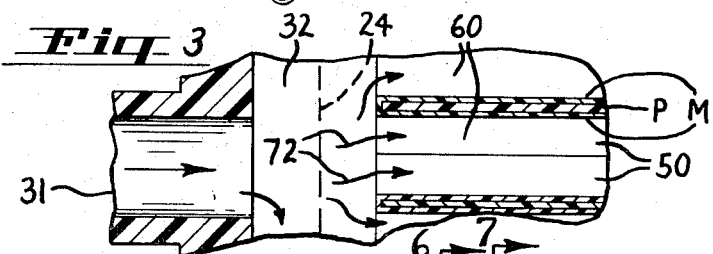
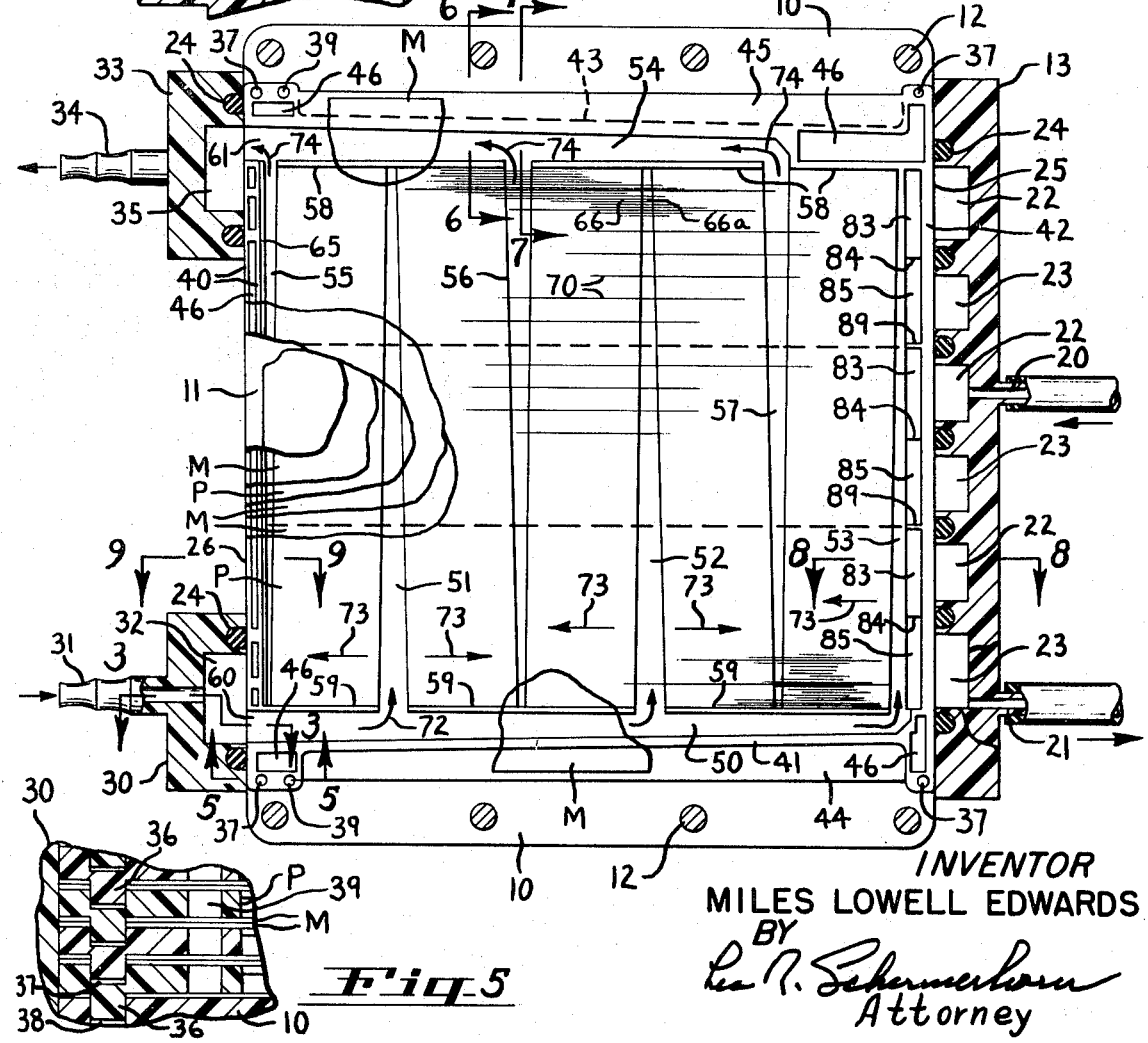
INVENTOR
MILES LOWELL EDWARDS
BY
Lea R. Schermerhorn
Attorney

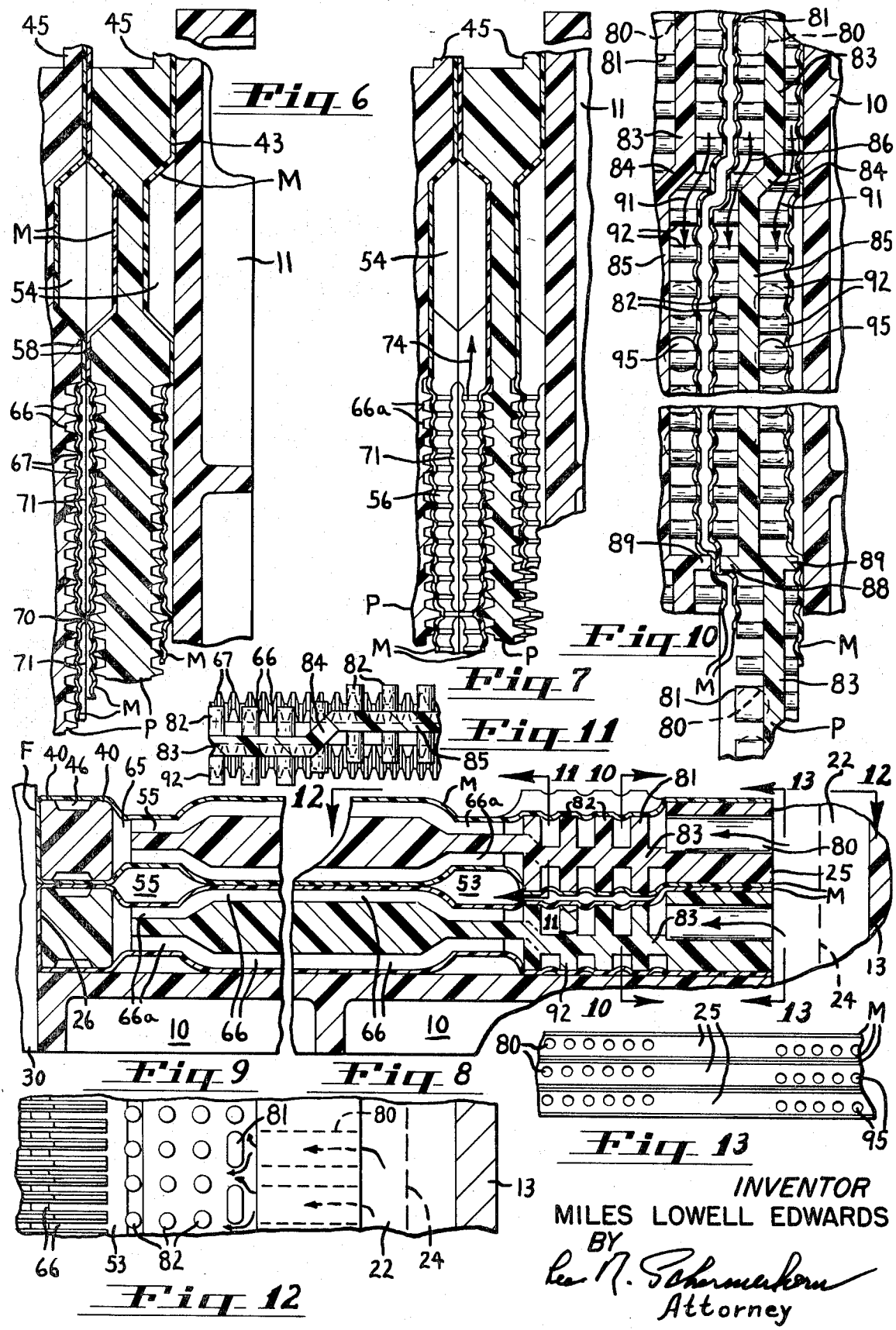

United States Patent Office 3,541,595
Patented Nov. 17, 1970

3,541,595
MEMBRANE FLUID DIFFUSION EXCHANGE
DEVICE
Miles Lowell Edwards, 13191 Sandhurst Place,
Santa Ana, Calif. 92705
Continuation-in-part of applications Ser. No. 631,668,
Apr. 18, 1967, Ser. No. 692,151, Dec. 20, 1967, and
Ser. No. 734,369, June 4, 1968. This application June
9, 1969, Ser. No. 831,296
Int. Cl. B01d 3/00
U.S. Cl. 210—321                    16 Claims

ABSTRACT OF THE DISCLOSURE

A blood oxygenator is disclosed comprising a stack of grooved plastic plates and membrances. Each plate is enclosed in a single membrane sheet which is folded around one edge of the plate and overlies both faces of the plate whereby the membrane sheet forms substantially an envelope for the plate when the stack is assembled and clamped together. External port members on opposite sides of the stack circulate oxygen through channels inside the envelopes and circulate blood through channels between the envelopes. The same form of construction may also be used as a dialysis device.

CROSS REFERENCES TO RELATED APPLICATIONS

This application is a continuation-in-part of my copending applications Ser. No. 631,668 filed Apr. 18, 1967, now U.S. Pat. 3,459,310, Ser. No. 692,151 filed Dec. 20, 1967, and Ser. No. 734,369, filed June 4, 1968.

BACKGROUND OF THE INVENTION

This invention relates to a membrane fluid diffusion exchange device, particularly for the oxygenation or dialysis of blood.

My application Ser. No. 631,668 discloses an oxygenator having a stack of single membrane sheets clamped between grooved plates. The grooves define passageways for blood and oxygen on opposite sides of each membrane. Blood manifold distribution and collection passageways extend across the effective areas of the plates in interfingered relation in opposite directions from blood inlet and outlet passageways extending along opposite sides of the plates. A system of parallel fine grooves crosses the grooves defining the interfingered manifold passageways and defines groups of blood capillaries of uniform length between each pair of manifold passageways. Openings in the plates and membranes convey the blood and oxygen through the stack.

One of the embodiments in my application Ser. No. 692,151 has blood and oxygen flow patterns similar to those in Ser. No. 631,668 but has pairs of membrane sheets clamped between plates having registering grooves in their confronting faces. The grooves define diffusion passageways for oxygen flowing in the grooves and blood flowing between the membranes of each pair. The pressure of the blood is greater than the pressure of the oxygen allowing the blood to deflect the membranes partially into the oxygen grooves to form the blood passageways. This arrangement prevents the blood from coming into contact with the surfaces of the plates.

Similarly, in Ser. No. 734,369 the blood flows between pairs of membranes and does not contact the surfaces of the plates. A different blood flow pattern is provided to promote turbulent rather than laminar flow of the blood in the diffusion passageways. In this device each membrane sheet is twice as large as a plate and is folded around one edge of its supporting plate to overlie opposite faces of the plate. Clamping pressure on the stack of plates and membranes seals the membranes to each other and to the plates in peripheral border areas whereby each membrane in effect forms an envelope for its supporting plate but leaving three edges of the plate exposed.

The blood flows between these envelopes out of contact with the plates and the oxygen circulates within the envelopes. External blood inlet and outlet connections are clamped against the side of the stack which presents the enfolded edges of the plates and external oxygen inlet and outlet connections are clamped against a side of the stack which presents the exposed edges of the plate.

SUMMARY OF THE INVENTION

The present device comprises a stack of plates and membranes clamped together between rigid end plates so that there can be no leakage between the clamped surfaces. A membrane twice the size of a plate is folded around one edge of each plate so as to overlie opposite faces of the plate. These opposite faces are each provided with a flat border sealing area which receives the clamping pressure on the stack to clamp the plates against their membranes and clamp adjacent membranes against each other. Thus, each membrane in effect forms an envelope for its supporting plate, although three edges of the plate are exposed. There are no separators between adjacent membranes.

One of the exposed edges of each plate contains inlet and outlet openings for oxygen communicating with parallel grooves in the faces of the plate. These openings provide external connections for circulating oxygen within the envelopes. The grooves in one face of the plate communicate with the inlet openings and the grooves in the opposite face communicate with the outlet openings.

Registering grooves in confronting surfaces of adjacent plates permit deflection of the membranes into such grooves to provide blood inlet and outlet passageways between adjacent envelopes. At the enfolded edges of the plates, these inlet and outlet grooves extend across the border sealing area to form openings between the envelopes in communication with external blood inlet and outlet connections. Over the main area of the plate the membranes are deflected partially into the parallel oxygen grooves to form diffusion passageways for the blood in membrane fluid diffusion relationship with the oxygen in the plate grooves.

Objects of the invention are to provide an improved membrane fluid diffusion exchange device, to provide a device which comprises a stack of grooved plates and membranes, to provide an arrangement in which the plates are all identical with each plate substantially enclosed in a single membrane envelope, to provide such a stack with passageways for a first fluid between adjacent envelopes and passageways for a second fluid within each envelope, to provide an improved and simplified ducting and manifolding arrangement for the inlet and outlet flows of the two fluids, to provide a device which overcomes leakage problems and to provide a device of the type described which is less complicated and expensive to manufacture than conventional apparatus so that the device may be discarded after a single use.

The invention will be better understood and additional objects and advantages will become apparent with reference to the following description of the preferred embodiment illustrated in the accompanying drawings. Various changes may be made in the details of construction and arrangement of parts and certain features may be used without others. Although a blood oxygenator is illustrated by way of example, it is understood that the principles of the invention are also applicable to dialysis devices and devices for other purposes involving membrane fluid diffusion exchange between two fluids.

BRIEF DESCRIPTION OF THE DRAWINGS

FIG. 1 is a perspective view of a membrane fluid diffusion exchange device embodying the principles of the invention;

FIG. 2 is a vertical sectional view of the device in FIG. 1 with parts broken away;

FIG. 3 is a sectional view on the line 3—3 in FIG. 2, showing the external blood inlet connection;

FIG. 4 is an enlarged fragmentary perspective view, with parts broken away, showing the external blood inlet connection;

FIG. 5 is a sectional view on the line 5—5 in FIG. 2;
FIG. 6 is a sectional view on the line 6—6 in FIG. 2;
FIG. 7 is a sectional view on the line 7—7 in FIG. 2;
FIG. 8 is a sectional view on the line 8—8 in FIG. 2;
FIG. 9 is a sectional view on the line 9—9 in FIG. 2;
FIG. 10 is a sectional view on the line 10—10 in FIG. 8;
FIG. 11 is a sectional view on the line 11—11 in FIG. 8;
FIG. 12 is a view on the line 12—12 in FIG. 8 with the top membrane removed; and
FIG. 13 is a view on the line 13—13 in FIG. 8 with the external oxygen connection removed.

DESCRIPTION OF THE PREFERRED EMBODIMENT

Referring first to FIGS. 1 to 5, the device comprises a stack of plates P and membranes M clamped between a pair of rigid end plates 10 and 11. Clamping pressure is maintained by a plurality of marginal bolts 12 extending between the end plates at two opposite edges of the stack. The plates P are preferably molded of a suitable plastic such as polyethylene and, in an oxygenator, the membranes M preferably comprise a thin film of suitable permeable material such as silicone rubber. In a dialysis device the membranes are preferably cellophane. End plates 10 and 11 may be made of metal although a hard plastic such as styrene acrylonitrile reinforced with glass fibers is preferred.

After the clamping bolts 12 have been tightened, a plate 13 is secured to one edge of the stack by screws 14 to provide external oxygen inlet and outlet connections for the stack. Screws 14 extend through elongated holes 15 in the plate 13 and have threaded engagement with tapped holes 16 in the end plates 10 and 11. Plate 13 is equipped with an external oxygen inlet connection 20 and an external oxygen and carbon dioxide outlet connection 21.

Inlet connection 20 communicates with a three fingered groove 22 on the inside of plate 13 and outlet connection 21 communicates with a three fingered groove 23. The edges of plates P adjacent the plate 13 are flush with the edges of plates 10 and 11 and the grooves 22 and 23 are marginally sealed by a sealing ring or rings 24. Sealing ring 24 is contained in circuitous grooves in plate 13 and bears against the exposed edges 25 of plates P. Sealing ring 24 extends around and between the three fingered grooves 22 and 23 are indicated in FIG. 1. Thus, plate 13 constitutes an oxygen inlet and outlet member.

The opposite edges 26 of plates P are enfolded in the membranes M. Each membrane M is twice as long as plate P and has a fold F which enfolds the edge 26 so that opposite faces of each plate are covered by the membrane with the other three edges of the plate exposed. The edges 26 of the plates are flush with the adjacent edges of end plates 10 and 11. In operation, the plates P, 10 and 11 are normally disposed in vertical position as shown in FIGS. 1 and 4.

A blood inlet member 30 has an external connection 31 communicating with an internal groove 32. A similar blood outlet member 33 has an external connection 34 communicating with an internal groove 35. Inlet member 30 is mounted at the lower edge of the stack and outlet member 33 is mounted at the upper edge of the stack by means of screws 14 in the end plates 10 and 11 as described in connection with plate 13. Seal rings 24 surround the grooves 32 and 35 and bear against the membrane folds F on the edges 26 of the plates P. Groove 32 forms an inlet manifold chamber and groove 35 forms an outlet manifold chamber for the blood.

The plates P are held in alignment with each other in the stack by a projection 36 at each corner of the plate which fits into a registering recess 37 in an adjacent plate. The end plate 10 has recesses 38 to receive projections 36 on the first plate P. Assemblage of the plates is facilitated by a pair of holes 39 in each plate P to receive temporary supporting pins during the stacking process.

Around the margin of each plate P are flat border areas 40, 41, 42 and 43 providing narrow seal surfaces in the clamped assemblage. Areas 44 and 45 of the plate extending outside of these seal areas are reduced in thickness on one face of the plate in order to concentrate the clamping pressure more effectively on a narrow ridge. The seal surfaces 40, 41, 42 and 43 bear against the membranes and clamp adjacent membranes together in this border area to prevent leakage at the three exposed edges of the plates from between the plates and the membranes and from between adjacent membranes.

The membranes overlie all of these seal areas 40, 41, 42 and 43. Thus, when the stack is clamped, each membrane forms an envelope effectively enclosing opposite faces of its supporting plate P even though three edges of the plate are exposed between the layers of membrane. Similar to thin areas 44 and 45, other areas 46 are recessed on one or both faces of the plate to avoid broadening the seal areas.

A groove 50 defines a blood inlet passageway extending along the lower edge of each plate P. Extending vertically upward from groove 50 are vertical grooves 51, 52 and 53. A horizontal groove 54 defines a blood outlet passageway extending along the top of each plate P. Extending downward from the groove 54 are vertical grooves 55, 56 and 57 in interfingered relation with the vertical grooves 51, 52 and 53. The vertical grooves are all equidistantly spaced from each other. All of the grooves 50 to 57 are present in the same positions in the opposite face of the plate.

Border sealing areas 40 to 43 are continuous around the periphery of the plate P on its opposite faces except for the two interruptions at grooves 50 and 54. The upper ends of grooves 51, 52 and 53 terminate at an interrupted ridge 58 and the lower ends of grooves 55, 56 and 57 terminate at an interrupted ridge 59. Ridges 58 and 59 on adjacent plates clamp the membranes together as seen in FIG. 6.

The membranes M are deflected into the grooves 50 to 57 by the pressure of the blood between the membranes whereby these grooves are lined with the membranes and the same reference numerals will be employed to designate the blood passageways though it must be remembered that the blood does not come into direct contact with the plates P themselves. Corresponding grooves are aligned with each other in each plate P whereby the grooves in adjacent plates are in confronting relationship with each other to form the described membrane lined passageways. Thus, the grooves 50 to 53 form inlet and manifold distribution passageways between the membranes and grooves 54 to 57 form outlet and manifold collection passageways between the membranes. The passageways at 50 and 54 may also be described as manifold passageways and the passageways 51, 52, 53, 55, 56 and 57 may be described as submanifold passageways.

Each membrane M is drawn snugly around the edge 26 of its supporting plate, causing the membrane to hug the bottoms of grooves 50 and 54 where these grooves extend through the border sealing area 40 to form inlet and outlet openings 60, 61 for the blood between the membranes. Inlet openings 60 appear in end view in FIG. 4 and outlet openings 61 are similar.

Extending vertically along the plates just inside the innermost border seal area 40 is a series of openings at 65 extending through the plate between its opposite faces. These openings appear as a continuous slot in FIG. 2 but for structural purposes the slot is bridged at intervals by narrow webs of plastic of less thickness than the seal area 40.

Extending from openings 65 to the outside or remote edge of groove 53 is a system of fine parallel grooves 66 covering the entire area of the plate on both faces between grooves 50 and 54. The grooves 66 are continuous across the sides and bottoms of the grooves 51, 52, 53, 55, 56 and 57 as indicated at 66a. The grooves 66 are separated by low ridges 67 and at intervals by high ridges 70 as shown in FIG. 6. The high ridges 70 in confronting surfaces of adjacent plates clamp the membranes between them to define a plurality of diffusion passageways 71 for the blood. The blood flows in a thin film through each passageway 71 wherein the two membranes are supported in closely spaced relationship by the confronting but spaced apart low ridges 67 in adjacent plates P.

Diffusion passageways 71 are all of uniform length extending between and communicating with the vertical distributing and collecting manifold passageways 51, 52, 53, 55, 56 and 57. Thus, the blood enters passageway 50 along the lower edges of the plates and flows upwardly through distribution passageways 51, 52 and 53 as indicated by arrow 72 in FIG. 2. The upward direction of flow assists in purging the air out of the system as it is initially primed with blood.

From the distribution passageways 51 and 52 the blood flows in opposite directions through diffusion passageways 71 to the vertical collection passageways 55, 56 and 57, respectively, as indicated by arrows 73. Blood rising in the end distribution passageway 53 flows through diffusion passageways 71 toward collection passageway 57 in a similar manner. The return flow in collection passageways 55, 56 and 57 is also in an upward direction, these flows combining in outlet passageway 54 to leave the oxygenator as indicated by arrow 74. The uniform length and size of the discrete diffusion passageways 71 impose uniform resistance to flow whereby the rates of flow and elapsed times are identical in all the passageways 71, insuring uniform treatment of the blood.

Incoming oxygen from inlet chamber 22 enters inlet holes 80 in the exposed edges 25 of the plates P and passes around deflector posts 81 and 82 to the ends of grooves 66 on one face of each plate as shown in FIGS. 8 and 12. A wide deflector post 81 is aligned with each hole 80 as shown in FIG. 12 to divert the flow laterally and deflectors 82 further break up and distribute the streams so that there will be substantially uniform flow in the grooves 66. The inlet holes 80 are arranged in three groups to communicate with the three fingers of inlet chamber 22 in FIG. 2.

Deflector posts 81 and 82 are mounted on a depressed, thin web portion 83 of the plate P which is offset at 84 from an adjacent depressed, thin web section 85 containing additional deflector posts 82. Incoming oxygen may pass vertically downward from web section 83 to web section 85 as indicated by arrow 86 to enter the grooves 66 aligned with this web section, as shown in FIG. 10. The lower edge of each web section 85 is separated from the next lower web section 83 by horizontal ridges 88 and 89 on opposite faces of the plate P. The membranes are clamped together between ridges 88 and 89 in adjacent plates.

With reference to FIG. 2, oxygen enters the three web sections 83 on the back face of the plate and crosses offsets 84 to adjacent sections 85 still on the back of the plate. From sections 83 and 85 oxygen flows through the grooves 66 on the back face of the plate crossing the vertical grooves 53, 57, 52, 56, 51 and 55 through the groove portions 66a. At the left side of the plate the oxygen passes through openings 65 to the front face and then passes to the right in return flow on the front face through grooves 66 and 66a to plate web sections 83 and 85. Oxygen in grooves 66 is in membrane diffusion exchange relation with the blood in passageways 71.

On the front face of the plate, as seen in FIG. 2, the oxygen returning to web section 83 passes downwardly over offset 84 to web section 85 as indicated by arrows 91 in FIG. 10 and around posts 92 similar to posts 82 to outlet holes 95. Outlet holes 95 communicate with the front face of the plate in FIG. 2 and are arranged in three groups for discharge into the three fingers of outlet chamber 23. Oxygen returning directly to web section 85 flows around posts 92 to holes 95.

The posts 92 are merely membrane supporting posts while posts 81 and 82 serve both as flow deflectors and as membrane supports. Web sections 83 and 85 form grooves in opposite faces of the plate which are continuous in a vertical direction in FIG. 2 except for the two interruptions at horizontal ridges 88 and 89. The posts 81, 82, and 92 support the membranes in these groove areas.

The oxygen pressure is maintained at a lower value than the blood pressure so that the blood pressure will hold the membranes apart in diffusion passageways 71 as shown in FIG. 6 and to prevent any possibility of leakage of oxygen into the blood. If any leakage should occur through a defective membrane, it will be in a direction from a blood passageway into an oxygen passageway from whence it will be discharged through oxygen and carbon dioxide outlet 21. This outlet is located at the lowest point in outlet chamber 23 to serve as a liquid drain if necessary. The oxygen supply is normally humidified sufficiently to prevent drying of any leakage blood and clogging of the oxygen passageways before the blood reaches outlet 21.

When the device is used as a dialyzer, cellophane membranes become sufficiently flexible and stretchable upon being wetted to deflect into the grooves to substantially the same extent as the silicone rubber membranes herein described. In a dialyzer the blood flows in the blood passageways described herein and the dialysis liquid flows in the described oxygen passageways.

Having now described my invention and in what manner the same may be used, what I claim as new and desire to protect by Letters Patent is:

1. A membrane fluid diffusion exchange device comprising a stack of plates, a membrane envelope substantially enclosing each plate, each envelope comprising a membrane sheet folded around one edge of a plate and overlying opposite faces of the plate leaving the remaining edges of the plate uncovered, a flat peripheral border area on each plate, means clamping said stack of plates and envelopes together with adjacent envelopes in contact with each other in said border areas forming marginal seals between each plate and its envelope and between adjacent envelopes in the stack, said border area having two interruptions at said one edge of each plate, the plates having reduced thickness in said two interruptions to provide a pair of multiple port openings between said envelopes for the inlet and outlet of a first fluid circulating between said envelopes; parallel grooves in said opposite faces of the plates for circulation of a second fluid within said envelopes in membrane diffusion relation with said first fluid, inlet openings for said second fluid in said uncovered edges of said plates on one side of said stack communicating with said grooves in one face of each plate, outlet port openings for said second fluid in said uncovered edges of said plates on said one side of said stack communicating with said grooves in the opposite face of each plate, and means for passing said second fluid through each plate from said grooves in one face to said grooves in said opposite face for return flow, said second fluid flowing in one direction on one face of the plate and in the opposite direction on the opposite face of the plate.

2. A device as defined in claim 1, said port openings for said second fluid comprising holes in said plates intermediate the opposite faces thereof and extending parallel therewith.

3. A device as defined in claim 1, said parallel grooves being perpendicular to said one edge of each plate around which said membrane sheet is folded, said port openings for said second fluid being in the opposite edge of each plate, and said means for passing said second fluid through the plates comprising openings through each plate adjacent said one edge.

4. A device as defined in claim 1, said inlet and outlet port openings for said second fluid comprising alternate groups of inlet openings and outlet openings extending along said uncovered edge of each plate.

5. A device as defined in claim 1 including external inlet and outlet connections for said first fluid having sealing rings around said multiple port openings for said first fluid, external inlet and outlet connections for said second fluid having sealing rings around said inlet and outlet port openings for said second fluid, and means securing said external connections to two different sides of said stack.

6. A membrane fluid diffusion exchange device comprising a stack of plates, a membrane having a length equal to twice the length of a plate folded around one edge of each plate and overlying the opposite faces of the plate, means clamping said plates and membrane together with adjacent membranes in contact with each other around the margins of the plates, all of said membrane enfolded edges being on one side of said stack, said plates having two areas of reduced thickness on each face of the plate at said enfolded edges forming a pair of multiple port openings between said membranes for the inlet and outlet of a first fluid circulating between said membranes; parallel grooves in said opposite faces of the plates running perpendicular to said enfolded edges, said grooves forming diffusion passageways for said first fluid between said membranes and forming diffusion passageways for a second fluid between said plates and membranes, and groups of inlet and outlet holes in the opposite edges of said plates for said second fluid.

7. A device as defined in claim 6, said inlet holes in each plate communicating with said grooves in one face of the plate and said outlet holes communicating with said grooves in the opposite face of the plate, and openings in each plate adjacent said enfolded edge arranged to transfer said second fluid from said one face to said opposite face for return flow.

8. A device as defined in claim 6 having plural groups of inlet holes and outlet holes in alternate order along said opposite edge of each plate.

9. A membrane fluid diffusion exchange device comprising a stack of identical plates, a membrane folded around one edge of each plate and overlying the opposite faces of the plate; a flat peripheral border area on each face of each plate, means clamping said stack of plates and membranes together forming a marginal seal between the plate and its membrane and between adjacent membranes in the stack, aligned grooves in opposite faces of each plate defining inlet passageways for a first fluid extending through said border seal areas at said enfolded edge of the plate, algined grooves in opposite faces of each plate defining outlet passageways for said first fluid extending through said border seal areas at said enfolded edge of the plate, said grooves interrupting said seal areas and forming regions of reduced thickness in said enfolded edges, said membranes conforming to said grooves to form inlet and outlet port openings between said adjacent membranes for said first fluid; parallel diffusion grooves in opposite faces of each plate for a second fluid between the plate and its membrane, said membranes being deflected partially into said parallel grooves in adjacent plates by said first fluid between said membranes so that said two fluids are in membrane diffusion relation with each other, distribution grooves for said second fluid inside of said border area in one face of each plate at one end of said diffusion grooves, collection grooves for said second fluid in corresponding positions in the opposite face of said plate, inlet holes for said second fluid in an uncovered edge of said plate extending between and parallel with said flat border areas on opposite faces of the plate to said distribution grooves, similarly arranged outlet holes for said second fluid extending from said edge of the plate to said collection grooves, and openings through the plate at the opposite end of said diffusion grooves for return flow of said second fluid on said opposite face of the plate.

10. A device as defined in claim 9, said inlet and outlet holes for said second fluid being in an edge of the plate opposite said enfolded edge and said parallel diffusion grooves extending between said border area at said enfolded edge of the plate to said distribution and collection grooves at said opposite edge of the plate.

11. A device as defined in claim 9 including membrane supporting deflector posts in said distribution and collection grooves.

12. A membrane fluid diffusion exchange device comprising a stack of rectangular membrane support plates, a membrane having a length equal to twice the length of a plate folded around one edge of each plate overlying the opposite faces of the plate, a pair of rigid end plates on opposite ends of said stack, bolts through said end plates clamping the stack together, the enfolded edges of said membrane support plates all being disposed on one side of the stack, inlet and outlet members for a first fluid secured to said end plates in engagement with said enfolded edges of said plates arranged to circulate said first fluid in passageways between adjacent membranes throughout said stack, and an inlet and outlet member for a second fluid secured to said end plates in engagement with exposed edges of said membrane support plates on another side of said stack arranged to circulate a second fluid between said membrane support plates and said membranes throughout said stack in membrane diffusion relation with said first fluid, said exposed edges of said plates containing inlet holes for said second fluid communicating with one face of each plate and outlet holes for said second fluid communicating with the opposite face of each plate.

13. A device as defined in claim 12, said inlet and outlet member for said second fluid being on the opposite side of the stack from said inlet and outlet members for said first fluid, and said clamping bolts being disposed on the remaining two sides of the stack.

14. In a membrane fluid diffusion exchange device, a membrane support plate having a flat peripheral border seal area on each face thereof for sealing engagement with a membrane in a clamped stack of plates and membranes, aligned grooves in opposite faces of the plate extending along one side thereof and through said border seal areas, aligned grooves in opposite faces of the plate extending along the opposite sides thereof and through said border seal areas, parallel branch grooves aligned in opposite faces of the plate extending from said first grooves in spaced, interfingered relation, parallel fine grooves in opposite faces of the plate crossing said branch grooves, said fine grooves being continuous across the bottoms and sides of said branch grooves, openings through the plate at one end of said fine grooves for transferring a fluid from said fine grooves in one face of the plate to the fine grooves in the opposite face, holes through the edge of the plate at the opposite end of said fine grooves communicating with said fine grooves in one face and holes through the same edge communicating with said fine grooves in the opposite face.

15. In a membrane fluid diffusion exchange device, a membrane support plate having a flat peripheral border seal area on each face thereof for sealing engagement with a membrane in a clamped stack of plates and membranes, aligned grooves in opposite faces of the plate extending along one side thereof and through said border seal areas, aligned grooves in opposite faces of the plate extending along the opposite sides thereof and through said border seal areas, parallel branch grooves aligned in opposite faces of the plate extending from said first grooves in spaced, interfingered relation, parallel fine grooves in opposite faces of the plate crossing said branch grooves, said fine grooves being continuous across the bottoms and sides of said branch grooves, and projections in marginal positions on one face of the plate and recesses in the opposite face of the plate aligned with said projections, said projections and recesses interfitting with the recesses and projections of adjacent plates in said stack.

16. A membrane fluid diffusion exchange device comprising a stack of plates, a membrane folded around one edge of each plate and overlying the opposite faces of the plate, means clamping said stack of plates and membranes together with adjacent membranes in contact with each other around the margins of the plates, all of said membrane enfolded edges being on one side of said stack, said plates having two areas of reduced thickness at said enfolded edges forming a pair of multiple port openings between said membranes for the inlet and outlet of a first fluid circulating between said membranes; grooves in said opposite faces of the plates for the circulation of a second fluid between said plates and membranes in membrane diffusion relation with said first fluid, inlet openings for said second fluid in edge portions of said plates communicating with said grooves in one face of each plate, outlet openings for said second fluid in edge portions of said plates communicating with said grooves in the opposite face of each plate, and means for passing said second fluid through each plate from said grooves in said one face to said grooves in said opposite face for return flow.

References Cited
UNITED STATES PATENTS

| | | | |
|---|---|---|---|
| 3,396,849 | 8/1968 | Lande et al. | 210—321 |
| 3,459,310 | 8/1969 | Edwards | 210—321 |

REUBEN FRIEDMAN, Primary Examiner

F. A. SPEAR, Jr., Assistant Examiner

U.S. Cl. X.R.

23—258.5; 210—456